Jan. 14, 1936.  J. LEDWINKA  2,027,739
RAILWAY VEHICLE WHEEL AND TIRE
Original Filed Dec. 15, 1931  2 Sheets-Sheet 1

INVENTOR.
Joseph Ledwinka,
BY
ATTORNEY.

Jan. 14, 1936.  J. LEDWINKA  2,027,739
RAILWAY VEHICLE WHEEL AND TIRE
Original Filed Dec. 15, 1931    2 Sheets-Sheet 2

INVENTOR.
Joseph Ledwinka,
BY
ATTORNEY.

Patented Jan. 14, 1936

2,027,739

UNITED STATES PATENT OFFICE 2,027,739

RAILWAY VEHICLE WHEEL AND TIRE

Joseph Ledwinka, Philadelphia, Pa., assignor to Edward G. Budd Manufacturing Company, Philadelphia, Pa., a corporation of Pennsylvania Application December 15, 1931, Serial No. 581,124
Renewed June 13, 1935

1 Claim. (Cl. 152—10)

My invention pertains to wheel bodies adapted to co-act with pneumatic tires which are intended for use upon railway vehicles and in which the pneumatic tires run directly on rails. It includes in certain of its aspects the structural features of the tire and wheel body proper considered separately, and in certain others the combinations between these features which render the combined wheel and tire particularly applicable for rail car use.

One of my objects has been to produce a tubeless tire including an annularly split portion whose halves are adapted to be clamped together by complementally divided rim sections to afford an adequate air seal. Other objects pertain to the structural features of the rim member proper which render it peculiarly applicable for use in combination with such a tire and/or adapted for use in connection with a tire running on a rail head of a conventional railway. A still further object has been to provide special means to prevent damage to the tire itself or danger or discomfort to the vehicle occupants incident to running upon a deflated tire.

Further objects and advantages and the manner in which I have attained them will be obvious from a reading of the subjoined specification in the light of the attached drawings, in which, Figure 1 is a transverse sectional view through the outer radial portion of a wheel body and tire in accordance with my invention.

Figure 1:
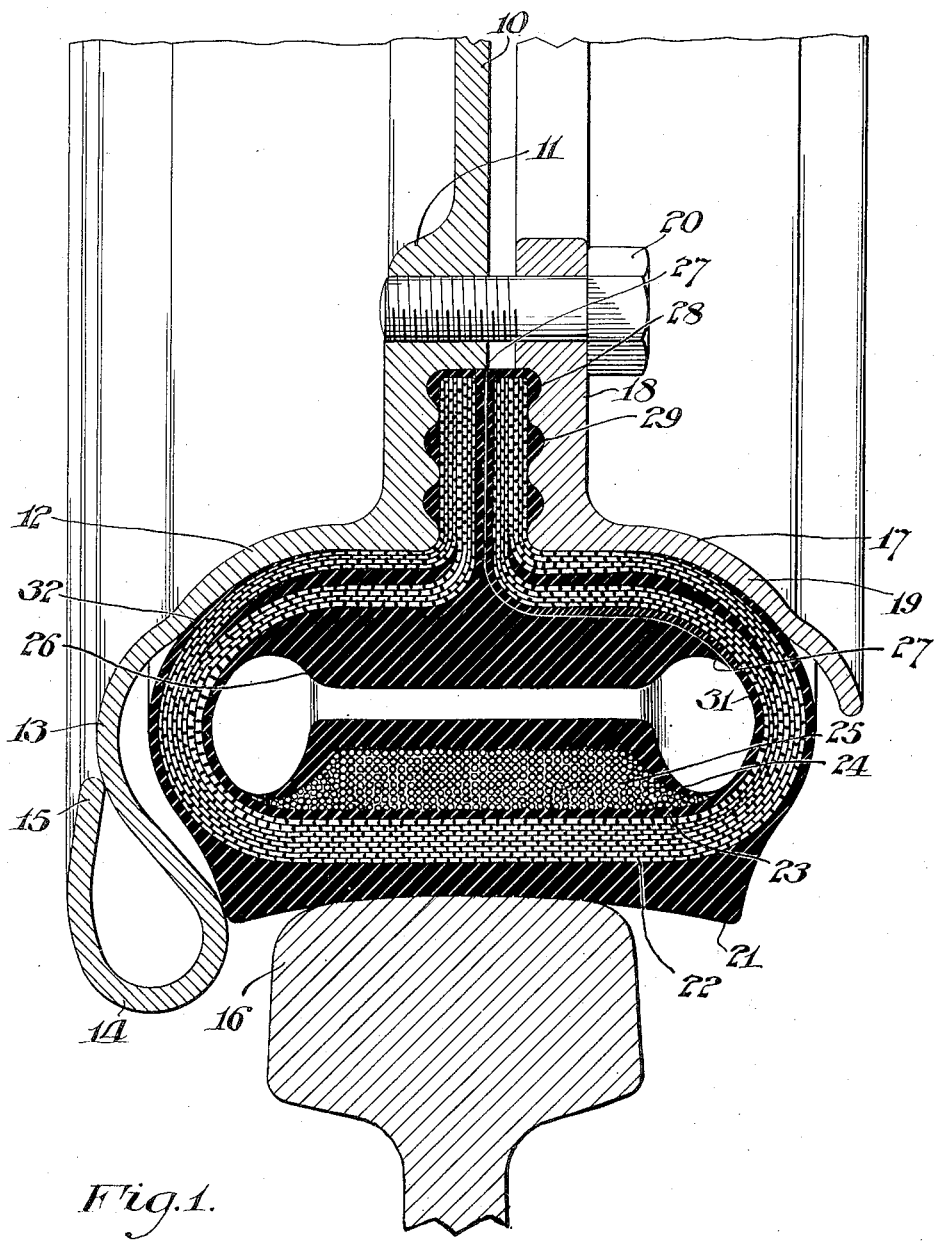
Figure 3:
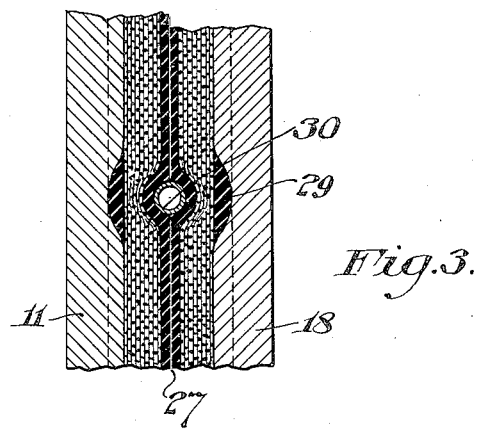
Figure 3 is a section on the line 3—3 of Figure 2.
Figure 2:
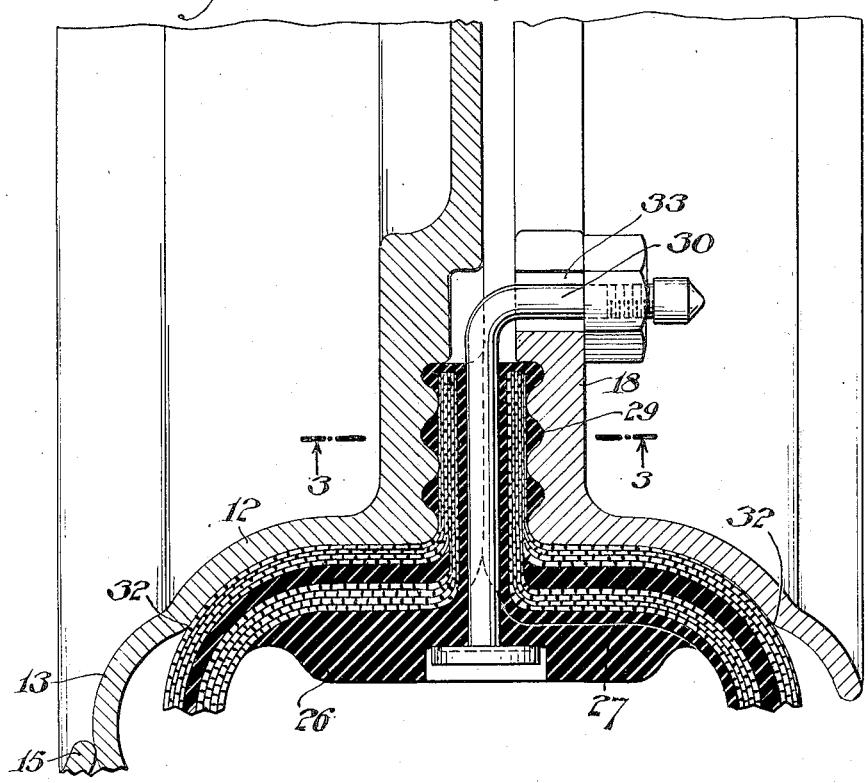
Figure 2 is a similar sectional view adjacent the valve stem.

Referring to the drawings by reference characters the numeral 10 indicates my wheel body proper. This wheel body is formed integral with one-half of the tire carrying rim, the rim being divided into two angular halves of which the second half is adapted to be clamped to that portion which is integral with the wheel body. To this end the wheel body is formed with an enlarged portion 11 toward its outer radial extremity and an axially extending flange 12 on the radial extremity of the portion 11, the portion 12 being adapted to constitute one-half of the tire bearing base of the rim. This tire bearing base is curved radially outwardly at 13 and axially at 14 and reversely against itself at 15 to form a guide flange which is adapted to co-act with a conventional railway rail head 16 in the guiding of the vehicle to which the wheel is secured in railway use. A second annular rim section 17 is provided with a radial flange 18 adapted to co-act with the portion 11 of the opposed rim section in securing the tire in place upon the wheel. This second rim section is likewise provided with an axially turned base portion 19 upon which a part of the tire base may seat. The rim sections are clamped together by means of a plurality of bolts 20 extending through the flange 18 and threaded into the portion 11 of the side of the rim which is integral with the main body of the wheel.

The tire member consists of an outer tread portion 21, a carcass portion 22 consisting of a plurality of transversely wound cords within the tread member, an inner rubber ply 23 within the carcass portion of the tire and an annular rubber projection 24 within this last named tread member, this last named rubber portion having embedded therein a large number of annularly extending cords 25 adapted to prevent undue expansion of the outer wall of the tire upon the inflation thereof. The inner wall of the tire is also formed with a radially extending projection 26 which is adapted to co-act with the projection 24 in limiting the radial movement of the wheel upon deflation of the tire. The base of the tire is annularly split as indicated at 27 and flange portions 28 extend radially inwardly from the opposite sides of the base. It will be noted that the line of division 27 between the opposite sides of the tire is curvilinear and that it extends for a considerable distance axially of the wheel so as to provide a very considerable area of contacting surfaces with respect to the opposite split portions to afford an effective seal. One of the contacting tire portions is also preferably rendered tacky by any suitable known chemical or mechanical expedient in order to facilitate the assembly of the tire parts before the rim members are clamped thereabout and to further improve the nature of the air seal. The flange portions of the tire are preferably provided with annular beaded portions 29 adapted to enter corresponding depressions in the radially extending flanges of the rim members to assist in positioning the tire and preventing a leakage of air therefrom. A suitable valve stem 30 is received within the inner projection 26 and extends between the opposite flange portions of the tire, being sealed therebetween by the pressure exerted through the bolts 20 to prevent air leakage.

An important feature of my invention consists in the provision of fabric windings of a nature tending to confine the shape of the tire in such a manner that it affords an air space of only small radial extent thus effectively limiting the degree of drop of the wheel body parts upon the deflation thereof to prevent damage to wheel or rail parts which might result from a contact between the guide flange on the wheel and the fish plates and bolts which secure the rail in place. These projections also prevent damage to the tire proper which might ensue in case it should deform to the extent incident to a considerable drop. It is to be noted that the side portions 31 of the walls of the tire possess an adequate degree of flexibility to assume the shape incident to deflation when the projections 24 and 26 come into contact with one another.

It will also be noted that the cords of the tire prevent that degree of expansion which would entail contact of the side walls thereof with the side walls of the rim outwardly of the portion of the bases of these members which must necessarily contact to give the necessary friction. Upon deflation of the tire it will flex outwardly of the outermost zone of contact 32 between the tire and rim and all frictional rubbing of these parts by reason of a collapse of the tire is thus avoided. It will be noted that in this connection the thin side wall portions 31 tend to collapse inwardly about the substantially circular annular spaces bounded thereby upon collapse, this inward collapse being a consequence jointly of the thin side wall section affording a flexibility of the circular side walls and of the relatively greater rigidity of the base and tread portions of the tire constituting the termini of these side wall portions.

In mounting the tire upon the vehicle the valve stem is first positioned between the halves and they are then pressed together along the line 27 and secured in place against the integral rim and wheel section 10. The opposed rim section 17 is then clamped against these members and is secured in tight clamping relationship thereagainst by the bolts 20. The rim section 17 is of course provided with a suitable slot 33 adapted to receive the bent end of the valve stem.

Modifications will be obvious to those skilled in the art and I do not therefore wish to be limited except by the scope of my sub-joined claim as interpreted in the light of the generic spirit of my invention.

What I claim is:

A vehicle tread member including, in combination, an annularly divided rim member each of whose annular sections includes a radially depending flange and a tubeless tire having its base portion split along a radially and axially extending line including a portion overlapping a considerable part of the axially extending base of the tire, each of said split tire portions including a radially depending flange, and means for clamping said rim sections together about the radially depending flanges on opposed tire portions to clamp them together and effect an air seal therebetween.

JOSEPH LEDWINKA.